United States Patent
Mickelson et al.

(10) Patent No.: US 7,088,793 B1
(45) Date of Patent: Aug. 8, 2006

(54) EQUALIZER FOR COMPLEX MODULATIONS IN VERY NOISY ENVIRONMENTS

(75) Inventors: Rodney L. Mickelson, Cedar Rapids, IA (US); Thomas L. Tapp, Iowa City, IA (US); Steven L. White, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 755 days.

(21) Appl. No.: 10/124,798

(22) Filed: Apr. 17, 2002

(51) Int. Cl.
*H03D 1/00* (2006.01)
*H04L 27/06* (2006.01)

(52) U.S. Cl. .................. 375/341; 375/340; 375/229; 714/794; 714/795

(58) Field of Classification Search ............ 375/229, 375/232, 265, 341, 233, 262, 340; 714/795, 714/794, 792
See application file for complete search history.

(56) References Cited

U.S. PATENT DOCUMENTS

| 6,023,783 | A | 2/2000 | Divsalar et al. | |
|---|---|---|---|---|
| 6,088,387 | A | 7/2000 | Gelblum et al. | |
| 6,275,525 | B1 * | 8/2001 | Bahai et al. | 375/232 |
| 6,563,877 | B1 * | 5/2003 | Abbaszadeh | 375/242 |
| 2002/0048331 | A1 * | 4/2002 | Tran et al. | 375/341 |
| 2002/0097814 | A1 * | 7/2002 | Eidson et al. | 375/340 |
| 2002/0186762 | A1 * | 12/2002 | Xia et al. | 375/232 |

OTHER PUBLICATIONS

"Synchronization Method And Apparatus For Modems Based On Jointly Iterative Turbo Demodulation And Decoding" by S. White, J. Whited, T. Tapp and R. Mickelson, U.S. Appl. No. 09/961,666, filed Sep. 24, 2001.

* cited by examiner

Primary Examiner—Jay K. Patel
Assistant Examiner—Sophia Vlahos
(74) Attorney, Agent, or Firm—Nathan O. Jensen; Kyle Eppele

(57) ABSTRACT

An equalizer is used with complex modulation modems to reduce intersymbol interference. The equalizer includes an equalizer filter that receives an input data signal and adapts to compensate for the noisy communications channels to reduce intersymbol interference to the input signal. A branch metric computer demodulates the equalizer filter adapted input data signal. A decision device delivers an alpha value, starting phase information and confidence values from the demodulated input data signal. A gain determination function receives the confidence values and determines adaptation gain for the equalizer filter. A remodulator receives the alpha value and starting phase information and remodulates the alpha value and starting phase information into a remodulated data signal. A summing function compares the remodulated data signal to a delayed version of the input signal to generate an error signal for the equalizer filter to adjust the equalizer filter.

19 Claims, 10 Drawing Sheets

EQUALIZER FOR COMPLEX MODULATIONS IN VERY NOISY ENVIRONMENTS

CROSS REFERENCE TO RELATED APPLICATIONS

This application relates to a patent application Ser. No. 09/961,666 filed Sep. 24, 2001 entitled SYNCHRONIZATION METHOD AND APPARATUS FOR MODEMS BASED ON JOINTLY ITERATIVE TURBO DEMODULATION AND DECODING by Steven L. White, Joseph C. Whited, Thomas L. Tapp, and Rodney L. Mickelson and assigned to the same assignee, Rockwell Collins Inc., and is incorporated herein by reference.

BACKGROUND OF THE INVENTION

This invention relates to communications systems, data transmission, modulation, coding, a bandwidth efficient advanced modulation waveform, and more specifically a channel equalization algorithm for use in these systems.

In digital communications systems such as cellular and PCS (personal communications systems), computer communications systems, and SATCOM (satellite communications) systems digital data is modulated by a modem onto a signal to be transmitted over a communications channel. The communications channel may add noise, interference, multipath, fading, and other corrupting influences that may result in loss of the data when demodulated at a receiver in the communications link. Channel coding has been used in communications systems for many years to detect and/or correct data bit errors by introducing redundant bits. The use of channel coding results in a reduction of data rate or an increase in required bandwidth due to the additional redundant bits.

Block codes and convolutional codes are two types of channel codes commonly used in the art of channel coding. A block code is an error detection and/or correction code in which an encoded block of data consists of n coded bits, containing k information bits (k<n) and n-k redundant check bits to detect and/or correct most errors. Types of block codes known in the art include Hamming codes, Golay code, BCH codes, and Reed Solomon codes.

Convolutional codes are widely used in the communications art to provide real time error correction. Convolutional codes continuously convert an entire data stream to encode the k information bits. The encoded bit stream depends on the current information bits and also on the previous input information bits. With a convolutional code, k information bits are coded into n coded bits in an encoder with m memory stages that store the state information of the encoder. A constraint length K of a convolutional code is defined as m+1 and a code rate r as k/n. The well-known Viterbi algorithm is commonly used in convolutional coding.

Recent advances in the art of coding to further improve error detection and correction while reducing bandwidth requirements include turbo codes and trellis coded modulation. Trellis coded modulation combines coding and modulation into one operation. By combing coding and modulation, redundancy can be obtained with no reduction in data rate or increase in bandwidth.

Continuous phase modulation (CPM) is being applied in communications due to its bandwidth efficiency and constant envelope characteristics. With CPM, the modulated signal phase transitions are smoothed. With BPSK (binary phase shift keying) a logic one is transmitted as one phase of a modulated signal and a logic zero is transmitted as a 180-degree shifted phase with a sharp transition in phase. This sharp phase transition results in broadening of the transmitted spectrum. With CPM the phase of the transmitted signal makes smooth phase changes over the bits of the modulating digital signal. An example of CPM currently in use is MSK (minimum shift keying).

Turbo codes allow reliable transmission of data across a communications channel near the theoretical limit predicted by Claude Shannon. A turbo code is generated by a parallel concatenation of two component convolutional codes separated by an interleaver. Turbo decoding uses a soft decoder at the input followed by an inverse interleaver and a second soft decoder. The output of the second soft decoder feeds back to the input of the first soft decoder through an interleaver. The data is passed through the turbo decoder in several iterations with each pass improving the quality of error correction.

A new data communications waveform has been developed by Rockwell-Collins called BEAM (bandwidth efficient advanced modulation). A goal of the BEAM waveform development is to increase the throughput of a typical 25-kHz UHF SATCOM channel by a factor of five over the MIL-STD-188-181A FSK waveform, while maintaining a reasonable Eb/No. The throughput will thus increase from the current 16 kbps to 80 kbps. The BEAM waveform must operate with current UHF satellites and have a constant envelope. The constant envelope requirement is important for this application because all current UHF satellites use saturating amplifiers. In addition, most, if not all, of the UHF user terminals utilize saturating amplifiers for power efficiency. The BEAM waveform jointly combines coded CPM modulation with turbo decoding. Although the BEAM waveform has been invented for UHF SATCOM applications, the BEAM waveform concept can be extended to any type of AWGN (additive white Gaussian noise) communications channel. Because of the underlying CPM modulation, it is particularly useful to those communications systems that rely on saturated amplifiers.

Channel equalization is widely used in communications systems to compensate for communications channel degradation of the transmitted signal in phase and amplitude. Equalizers compensate for the effects of frequency dependent phase and amplitude distortion caused by multipath and transmit and receive filters. In digital communications systems, the digital data can be subject to intersymbol interference (ISI) that may be caused by the transmitter filter, distortion, communications channel conditions, and the receiver filter. The communications channel acts like an analog low pass filter with a frequency response that smears a digital signal such that received pulses that correspond to different symbols are not separable. An equalizer can be used to compensate for the effects of the communications channel by performing as a filter with a frequency response that approximates the inverse of the communications channel frequency and filter responses.

Several methods of determining the filter characteristics of an equalizer filter are known in the art. One method is automatic synthesis where the equalizer compares a received signal to a stored copy of an undistorted training signal. Comparing the two signals results in an error signal that can then be used to determine coefficients of the inverse filter. The automatic synthesis method is used in zero-force equalization (ZFE) and minimum mean-square error (MMSE) equalization. A shortcoming of the automatic synthesis method is the need to transmit the training signal.

Another method of calculating the filter coefficients for an equalizer filter is known as adaptive equalization. With the adaptive method, the equalizer attempts to minimize an error signal. In the case of decision-directed adaptive equalization, the error signal is based on the comparison of the equalizer output and an estimate of the transmitted signal generated in a decision device. Examples of decision-directed adaptive equalizers include the least mean square (LMS) algorithm, also called the stochastic gradient algorithm, and the recursive least squares (RLS) algorithm. The decision device makes an estimate of the transmitted signal from the output of the equalizer, and determines which, of a constellation of possible signals, was most likely to have been transmitted.

Many communication systems employ memory either implicitly in the modulation, such as continuous-phase modulation (CPM), or explicitly in a code, such as a convolutional code. In these systems, the receiver typically detects the transmitted sequence by a Viterbi or APP (a posterior probability) decoder that, in turn, operate on a trellis description of the memory in the system. These trellis-based algorithms typically require considerable time to make reliable decisions. Many subsystems within the demodulator require decisions from the demodulator and/or decoder in a timely manner. Decision-directed adaptive equalizers and decision-feedback equalizers represent two such classes of subsystems. In addition, recent coding advances, in particular iterative decoding of concatenated systems like turbo codes, allow the receiver to operate at unprecedentedly low signal-to-noise ratios (SNRs). At very low SNRs, the decoded decisions are initially very unreliable, which adversely affects the operation of the subsystems requiring these decisions. Typically, the subsystem, e.g., equalizer, has no indication of the confidence of the decisions.

What is needed is an algorithm for supplying timely decisions with confidence values ("soft decisions") to an adaptive decision-directed equalizer in a trellis-based communication system. The channel equalizer may use a simplified version of a demodulator that supplies soft decisions in parallel with the complete demodulator. A method for using the soft decisions from the decoder within the equalizer is required.

SUMMARY OF THE INVENTION

An equalizer for use with complex modulation modems that operate in noisy communications channel environments to reduce intersymbol interference is disclosed.

The equalizer comprises an equalizer filter that receives an input data signal and adapts to compensate for the noisy communications channel environments to reduce intersymbol interference to the input signal. The equalizer filter may be a finite impulse response filter having adjustable coefficients and gain.

A branch metric computer is connected to the equalizer filter for demodulating the equalizer filter adapted input data signal. The branch metric computer comprises a plurality of branch metrics computer blocks for computing branch metric values for a plurality of phase states. Each branch metric is computed as a square of a Euclidean distance between an actual symbol value and an ideal symbol corresponding to a phase state and alpha transition value.

A decision device is connected to the branch metric computer to deliver an alpha value and starting phase information and confidence values for the demodulated input data signal at a reduced latency. The decision device may be an APP decoder for providing a decoder metrics output confidence level with a reduced traceback depth to reduce latency. The APP decoder decision device may have a traceback depth of two symbols to reduce latency.

A gain determination function is connected to the equalizer filter and to the decision device to receive the confidence values and determine adaptation gain for the equalizer filter. The gain determination function determines adaptation gain to be a gain step size when the confidence value is greater than a threshold and declares an erasure and does not adapt the gain when the confidence value is less than the threshold. The gain determination function may increase the gain step size if several erasures have been determined and may decrease the gain step size if the confidence value for several data symbols have been greater than the threshold. The gain determination function may determine adaptation gain to be a maximum gain step size when the confidence value is greater than an upper threshold and may declare an erasure and not adapt the gain when the confidence value is less than a lower threshold. The gain determination function may vary gain step size when the confidence value is between the upper threshold and the lower threshold.

A remodulator is connected to the decision device to receive the alpha value and starting phase information and remodulate the alpha value and starting phase information into a remodulated data signal. The remodulator may be a lookup table to supply the remodulated data signal based on the alpha and starting phase.

A summing function is connected to the equalizer filter and to the remodulator to compare the remodulated data signal to a delayed version of the input signal to generate an error signal and to provide the error signal to the equalizer filter to adjust the equalizer filter.

It is an object of the present invention to reduce intersymbol interference in a communications system employing complex modulations in very noisy environments.

It is an object of the present invention to provide an equalizer for a communications system employing a bandwidth efficient advanced modulation waveform.

It is an advantage of the present invention to operate with a modem employing turbo coding and decoding and continuous phase modulation.

It is an advantage of the present invention to update a channel equalizer with a simplified decoder that supplies soft decisions.

It is a feature of the present invention to supply confidence values from a simplified decoder decision device to make an adaptation decision.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
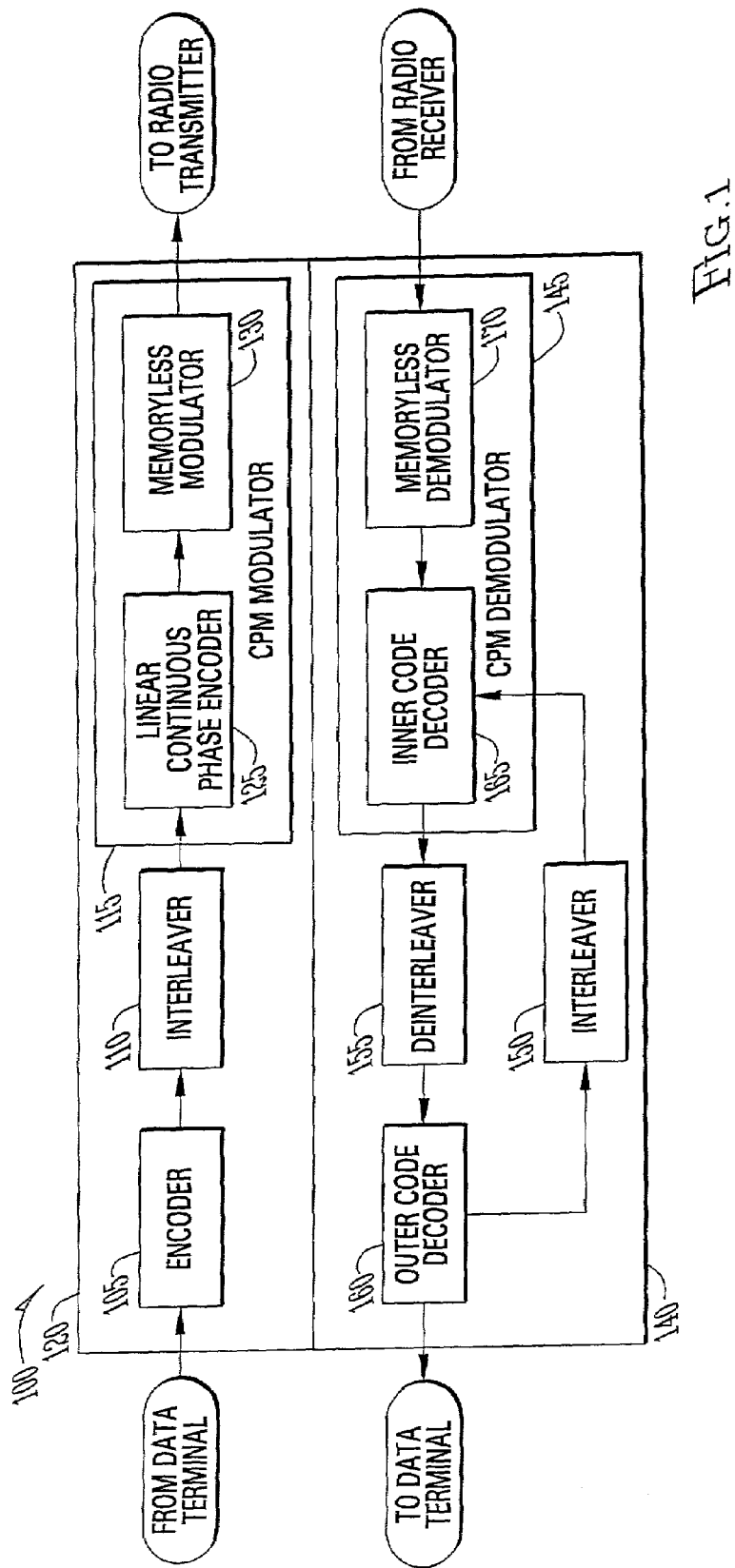
FIG. 1 is a block diagram of a bandwidth efficient advanced modulation modem with a modulator and a demodulator incorporating turbo coding and continuous phase modulation.

An equalizer for complex modulations in very noisy environments of the present invention relies on a simplified version or approximation of a soft output Viterbi algorithm (SOVA) or a posterior probability (APP) algorithm. The simplified algorithm is similar to a normal APP decoder algorithm, except that a traceback depth is very shallow, typically only two symbols. The soft output has a very high error rate, but can be computed with a relatively small time delay because of the shallow traceback depth. An equalizer accepts the soft outputs from a simplified decoder, and uses a confidence value from the equalizer to control the gain of the adaptation process. For example, this gain may be the step size of a least mean square (LMS) or a stochastic gradient algorithm. One approach is to compare the confidence values to a threshold based on SNR. If the confidence value is lower than the threshold, an erasure is declared and no adaptation is performed. If the confidence value exceeds or equals the threshold, then the adaptation algorithm adapts the equalizer using a fixed gain. In general, the gain is a possibly nonlinear function of the soft decisions. Since a long stream of low confidence values may be emitted from the simplified decoder, resulting in no adaptation for a long period of time, the function relating the confidence values to the adaptation gain may in general be a function of soft decisions from previous symbols as well.

The invention is useful for any communications system that requires equalization and employs a demodulation technique that introduces substantial latency before decisions are available and operates at low SNR. One such system is the bandwidth efficient advanced modulation (BEAM) modem where the demodulation requires a relatively slow iterative decoding process. The latency of this demodulation is such that it would be practically impossible to use demodulator/decoder decisions to adapt the equalizer quickly enough to account for changes in many channels of interest. The following paragraphs describe the BEAM system and how the equalization method and apparatus of the present invention may be incorporated into it.

A basic iterative serially concatenated turbo code encoder implementation requires an inner code encoder and an outer code encoder separated by an interleaver that reorders input data symbols. In the BEAM implementation, the modulation is designed to act as one of the codes so therefore must have memory spanning more than one symbol. A design constraint is that the modulation must be encoder-like and perform modulator functions similar to a convolutional code encoder. CPM (continuous phase modulation) is an example of modulation with memory, as the current symbol start phase depends on past symbol phase transitions. A conventional CPM modulator may be decomposed into a recursive convolutional encoder followed by a memory-less signal mapper. This decomposition fits the architectural needs of a BEAM SCCC (serial concatenated convolutional code) turbo codec (coder-decoder).

A BEAM modem 100 shown in FIG. 1 connected to a data terminal (not shown) comprises a BEAM coder or modulator 120 connected to a radio transmitter (not shown) and a decoder 140 connected to a radio receiver (not shown). The BEAM modulator 120 includes an outer convolutional code encoder 105 connected to a non-structured interleaver 110 and a continuous-phase modulator 115. The concatenation of the convolutional code and the CPM modulator 115 is treated as a serially concatenated turbo code, where the memory of the continuous-phase modulator 115 is the inner code. FIG. 1 shows how the CPM modulator 115 may comprise a recursive encoder 125 and a memoryless modulator 130.

In FIG. 1, the receiver decoder 140 comprises a CPM demodulator 145, a deinterleaver 155, an outer convolutional code decoder 160, and an interleaver 150. Two soft-input, soft-output a posterior probability (APP) algorithms, also called MAP (maximum a posterioi) or BCJR (Bahl Cocke Jelinek Raviv) algorithms or some approximation are implemented in a CPM demodulator 145 and the outer code convolutional code decoder 160. The CPM demodulator 145 comprises a memoryless demodulator 170 and the APP algorithm in an inner code decoder 165. The CPM APP algorithm in the CPM demodulator 145 is based on the same trellis one would use for maximum-likelihood sequence detection, only applying the APP algorithm rather than the Viterbi algorithm. The Viterbi algorithm is a maximum likelihood algorithm that finds a most probable transmitted information sequence. The Viterbi algorithm is a hard decision algorithm that can be modified into a soft output Viterbi algorithm (SOVA). The APP algorithm, more complex than the Viterbi algorithm, finds the probability that a certain bit was transmitted given the coded sequence. The APP algorithm performs forward and reverse or traceback path metric calculations through a block symbol trellis. The APP algorithm is a soft-input soft-output (SISO) function well suited for iterative turbo code applications where the soft output of one decoder provides a soft input to another decoder.

In FIG. 1 on the first iteration of the decoder 140, the CPM APP algorithm in the CPM demodulator 145 receives coded information bits from the BEAM modulator 120 over a communications link and calculates probability or confidence values for the received coded information bits. After an appropriate reordering in a deinterleaver 155, these probabilities are used by the code APP algorithm in the outer code decoder 160 to generate probabilities for the information bits and new probability estimates for the coded bits. The ratios of the newly calculated probabilities to those provided by the inner decoder (commonly called the extrinsic values) for the coded bits are then reordered in an interleaver 150 and delivered back to the CPM APP algorithm in the CPM demodulator 145. The CPM APP algorithm, using these new probabilities as an a priori distribution, refines its estimates of the probabilities of the coded bits. The ratios of these new probabilities to those provided by the outer code decoder 160 (the CPM demodulator's extrinsic values) are in turn re-ordered and passed to the outer code decoder 160. In practice, it is often advantageous to calculate the log of the probability values rather than the actual probabilities. An APP algorithm operating on the log of the probability values is required to approximate the nonlinear function $\ln(e^{x_1}+e^{x_2})$, the simplest approximation being $\max(x1, x2)$. This procedure continues iteratively, in effect joining the CPM demodulator 145 and the outer code decoder 160, to work at a significantly lower SNR than conventional separately decoded and demodulated CPM waveforms, or even the former state-of-the-art trellis-coded CPM waveforms.

One of the primary design rules for serially concatenated turbo codes is that the inner code be recursive. If this is the case, then the system can achieve interleaver gain, meaning that the SNR requirements decrease as the interleaver length increases. The high performance of the BEAM waveform is possible because the memory of a conventional CPM waveform can be modeled as a recursive code.

Figure 2:
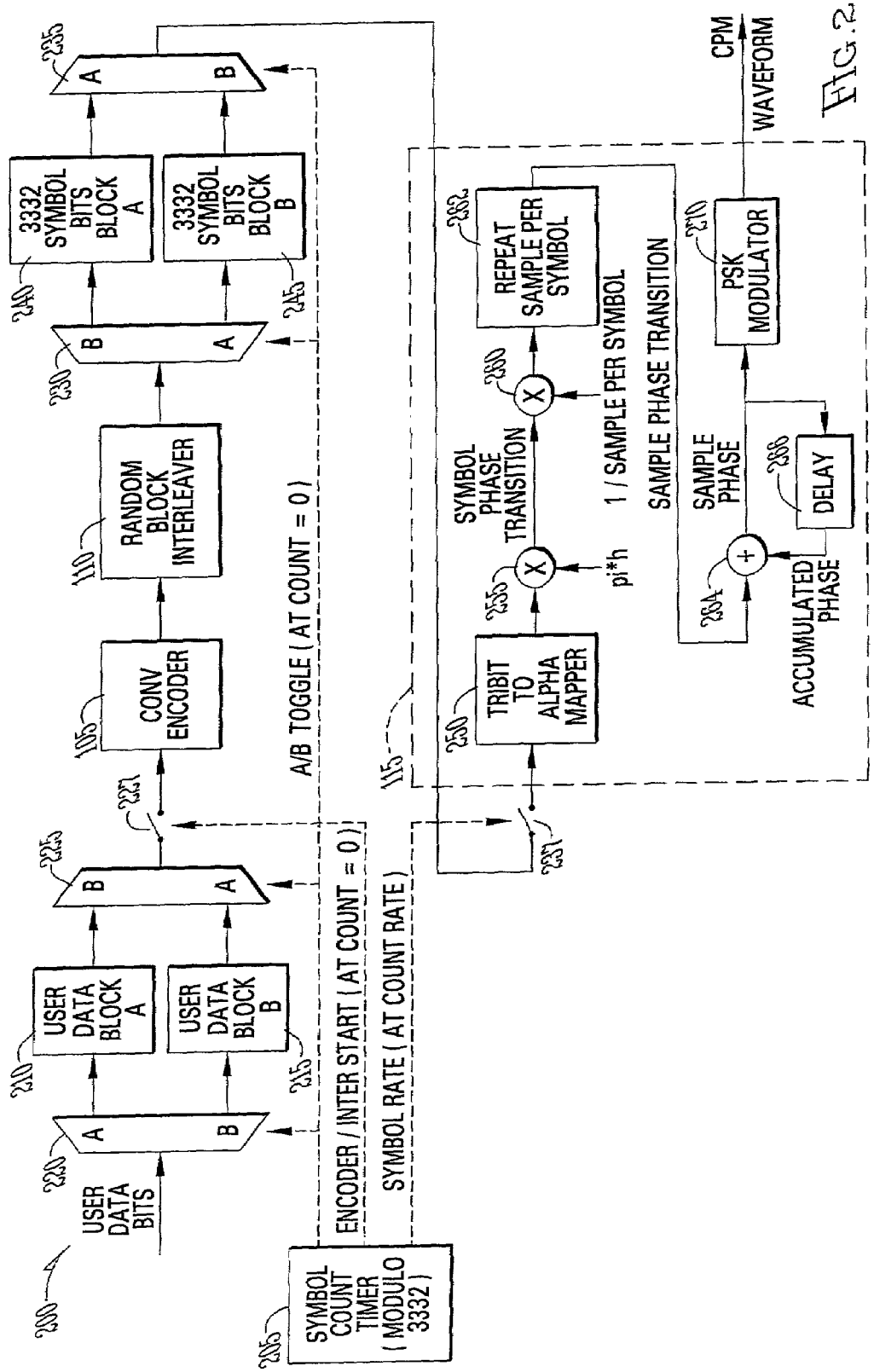
FIG. 2 is a detailed block diagram of the modulator of the modem in FIG. 1.

FIG. 2 is a block diagram of an embodiment of the BEAM modulator 120 of FIG. 1. User data bits are provided to the modulator 200 in three-bit symbols. The modulator 200 performs operations at a symbol rate and operations at a block rate where a block is 3332 or 666 symbols, for interleaver lengths 9996 or 1998 bits, respectively. The following description is specific to the length 9996 interleaver, but it readily generalizes to other block lengths that may be used in the BEAM modem. The block-rate operations take many symbol periods to complete; therefore, double buffering between symbol-rate operations and block-rate operations is required. The functions shown in FIG. 2 may be performed in hardware blocks known in the art or implemented in software in a digital signal processor or other processor.

Assuming path A in FIG. 2, an A/B toggle signal from a symbol count timer 205 sets switches 220, 225, 230 and 235 to the A position. Symbol count timer 205 in FIG. 2 provides a modulo 3332 timing signal to determine when the block is filled and then toggles the switches with the A/B toggle signal. During a previous block operation the switches 220, 225, 230, and 235 were in the B position and input user data bits at three bits per symbol were loaded into user data block B 215 as a current block of user data bits. As a next block of user data bits are input and stored to user data block A 210, the convolutional encoder 105 and the pseudo random block interleaver 110 are processing the current block of user data bits from user data block B 215 received through switch 227 under control of the symbol count modulo timer 205. A previous block of symbols in 3332 symbol bits block A 240 are passed through switch 235 to switch 237 that is opened and closed at a symbol rate under control of the symbol count timer 205 and CPM modulated in the CPM modulator 115. The block processing operations of encoding in encoder 105 and interleaving in interleaver 110, when finished, pass a current block of symbols to 3332 symbol bits block B 245 for storage. After every 3332 symbols as counted by the symbol count timer 205, the path A/B toggles.

In the implementation shown in FIG. 2, the convolutional encoder 105 may be either rate-2/3 or rate-5/6 or other rates as determined by the application. For the rate-2/3 encoder, a block of 6662 user data bits is encoded into 9996 bits (3/2*(6662 data bits+2 flush bits)). For the rate-5/6 encoder, a block of 8328 user data bits is encoded into 9996 bits (6/5*(8328 data bits+2 flush bits)).

The block interleaver 110 may have a pseudo random interleaving pattern to minimize any structure in the output bits relative to the input bits. The block interleaver 110 may be implemented in various methods know in the art.

In the CPM 115, each 3-bit symbol (9996 bits/3=3332 symbols) is mapped to an alpha value from a group of alpha values −7, −5, −3, −1, 1, 3, 5, and 7 in a tribit-to-alpha mapper 250. For example, a data symbol of 000 may be mapped to an alpha value of 7. The tribit-to-alpha mapper 250 may be a lookup table implemented in hardware or software in a digital signal processor. The alpha value is scaled by pi*h in multiplier 255 to generate a total phase transition for the symbol (alpha*pi*h radians of phase change per symbol where h is the modulation index). The symbol phase transition is then scaled in multiplier 260 and repeated 262 to generate a sample phase transition. The sample phase transition is added 264 to the previously accumulated phase, which is stored in a delay element 266, to generate a sample phase. The sample phases are then routed to a memoryless PSK modulator 270.

Figure 3:
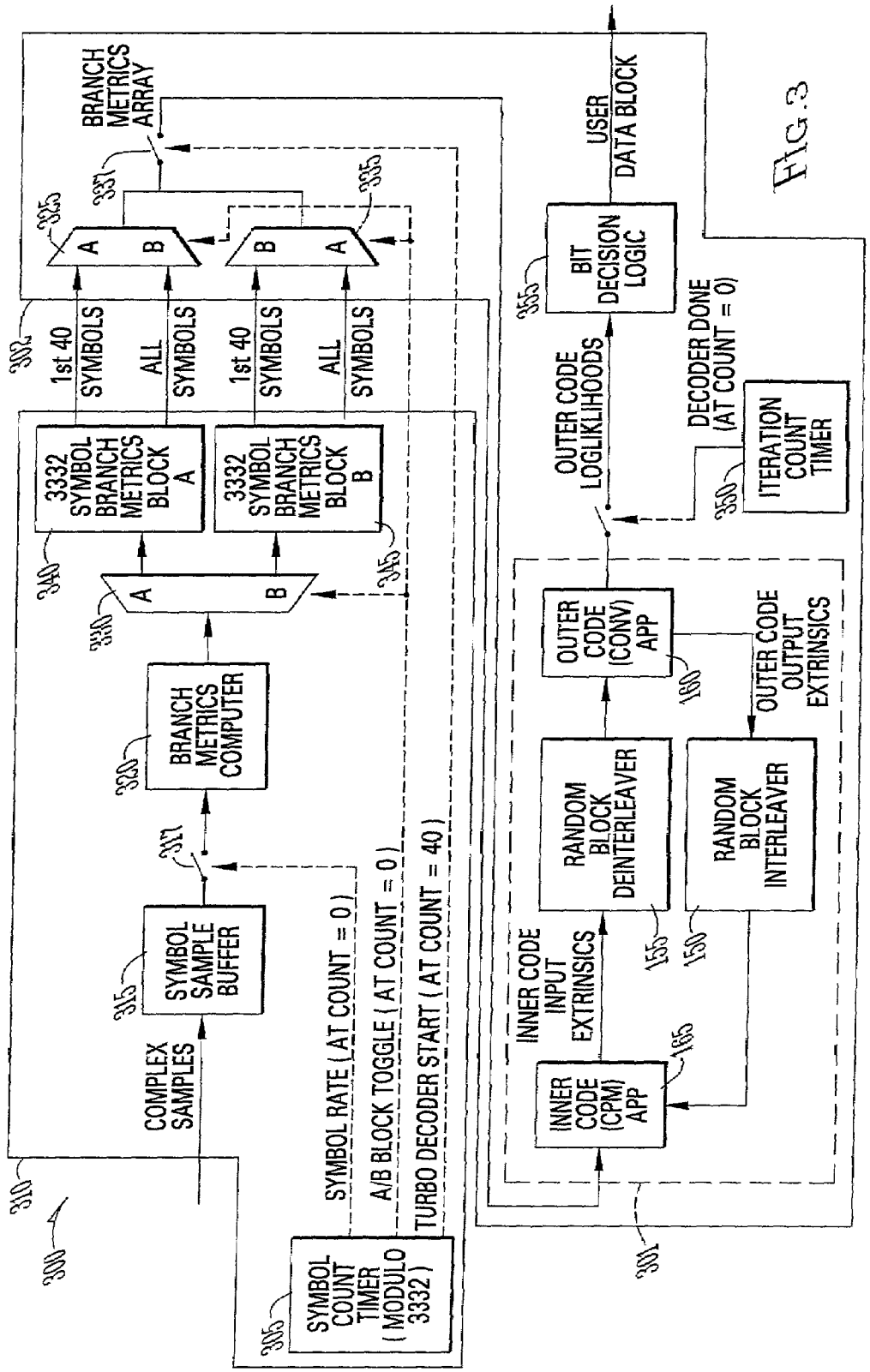
FIG. 3 is a detailed block diagram of the demodulator of the modem in FIG. 1.
Figure 4:
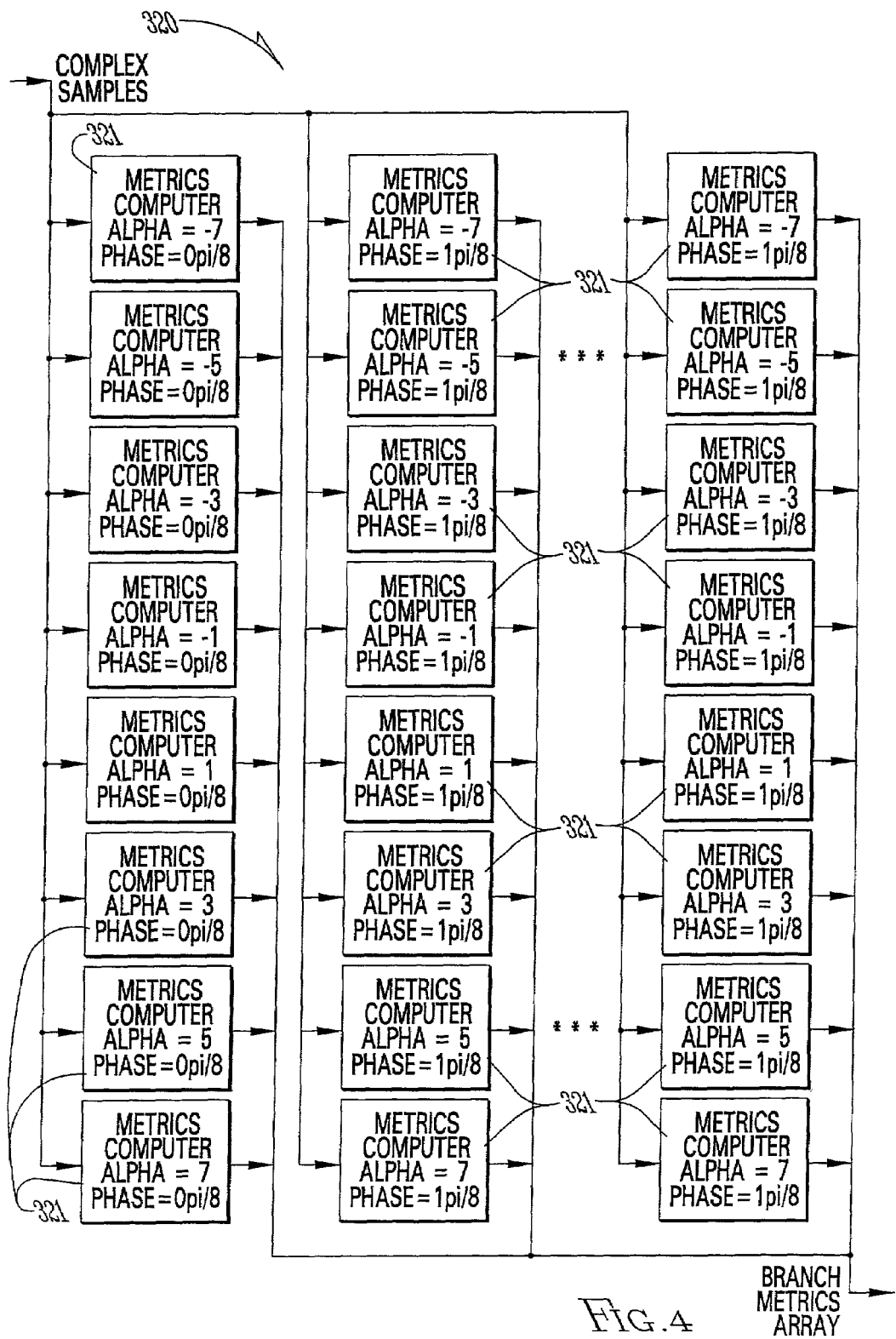
FIG. 4 is a detailed block diagram of a branch metric computer incorporated in the demodulator of FIG. 3.
Figure 5:
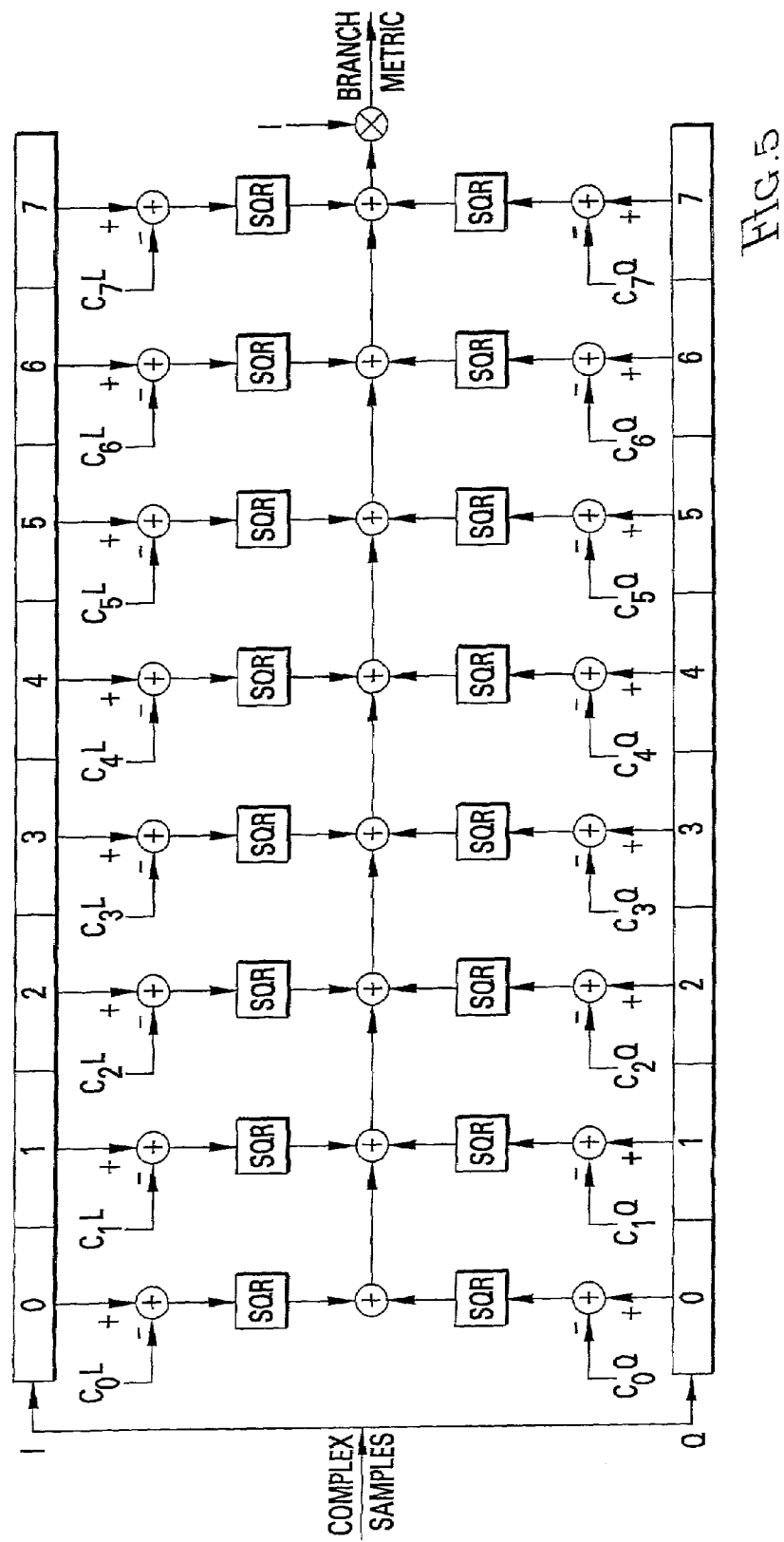
FIG. 5 is a detailed block diagram of a branch metric computer block in the branch metric computer of FIG. 4.

FIG. 3 is a block diagram of an embodiment of a BEAM demodulator 140 of FIG. 1. Signal acquisition, carrier tracking, and time tracking are not shown in this figure in order to minimize the complexity of the block diagram. An iterative turbo decoding 301 in the BEAM demodulator 300 is very processing intensive, beyond the capability of current programmable digital signal processors. FIG. 3 illustrates a hardware implementation of the turbo decoding algorithm in an FPGA (field programmable gate array) 302. Functions in block 310 are parts of the BEAM demodulator algorithm that may be implemented in real-time software in a digital signal processor. The CPM demodulator 145 of FIG. 1 is implemented as a demodulator branch metrics computer 320 and an inner code APP module 165 along with double buffering functions in FIG. 3 as discussed in greater detail below. For each complex symbol sample set, the demodulator branch metric computer 320 generates a vector of 128 real-valued metrics. As shown in FIG. 4 there is one branch metrics computer 321 for each phase state (16 phase states with three phase states shown in FIG. 4) and each alpha or CPM level (eight levels) for a total of 128. The demodulator branch metric computer 320 performs the functions of the memoryless demodulator 170 in FIG. 1. FIG. 5 is a block diagram of one of the branch metrics computer blocks 321. Each branch metric value is computed as the square of the Euclidean distance between the actual symbol samples and the ideal samples corresponding to a particular alpha and symbol start phase. An implementation would generate only half the branch metric values for each symbol, as only the even or odd start phases are valid on alternating symbols.

An equivalent means of generating these branch metrics is to compute the (complex) correlation between the actual symbol samples and the ideal symbol samples corresponding to a particular alpha, at a single starting phase. That is, the ideal symbol samples are point-wise multiplied by the complex conjugate of the actual symbol samples, and the results are summed. This is done for each alpha, but only one starting phase. The metric for a different phase is computed as the cosine of the phase difference times the real part of the correlation, minus the sine of the phase difference times the imaginary part of the correlation. The metrics calculated by this formula are then scaled by two times the signal-to-noise ratio. The metrics calculated by this correlation method are within a constant offset of those generated by direct calculation of the Euclidean squared distance. The constant offset does not affect the performance of the APP algorithm.

Like the modulator 200 in FIG. 2, the demodulator 300 consists of operations that are performed at the symbol rate and operations that are performed at the block (3332 symbol) rate. The block-rate operations take many symbol periods to complete; therefore, double buffering between symbol-rate operations and block-rate operations is again utilized to implement the BEAM waveform. Note also that the double buffering functions may be a natural division to split the demodulator 300 between multiple digital signal processors (not shown).

Assuming path A in FIG. 3, A/B block toggle signal from a symbol count timer 305, sets switches 330, 325, and 335 to the A position. Complex input samples are stored in a symbol sample buffer 315 that stores the samples before processing. As each set of complex symbol samples is received for the next block from the symbol sample buffer 315 through switch 317 under control of the symbol count timer 305 at a count rate of modulo 3332, the branch metric computer 320 generates a vector of branch metrics and stores them in 3332 symbol branch metrics block A 340. At the same time the iterative turbo decoder 301 comprising the inner code APP CPM detector module 165, the block interleaver 150, the outer code APP convolutional decoder module 160 and the block deinterleaver 155 of FIG. 1 are decoding the current block of branch metrics from 3332 symbol branch metrics block B 345. The APP demodulator algorithm uses 40 symbols of the next block of symbols to initialize its backward recursions. Since the iterative turbo decoder 301 requires 40 symbols of branch metrics from the next block, it is not allowed to start until the branch metrics for those 40 symbols are collected in 3332 symbol branch metrics block A 340 and switch 337 is closed under control of the symbol count modulo 305. In effect, this means that the iterative turbo decoder 301 processing time is decreased to 3332–40 symbol periods. The iterative turbo decoder 301 executes for ten iterations under the control of an iteration count timer 350, after which a turbo decoder output log-likelihood vector is routed to a bit-decision logic operation 355 to generate a block of demodulated/decoded user data bits. The bit decision logic operation 355 converts the soft output of the iterative turbo decoder 301 to hard decisions. This is done by mapping the sign of the iterative turbo decoder 301 soft output to either 0 or 1. After every 3332 symbols, the path A/B toggles under control of the symbol count timer 305.

Figure 6:
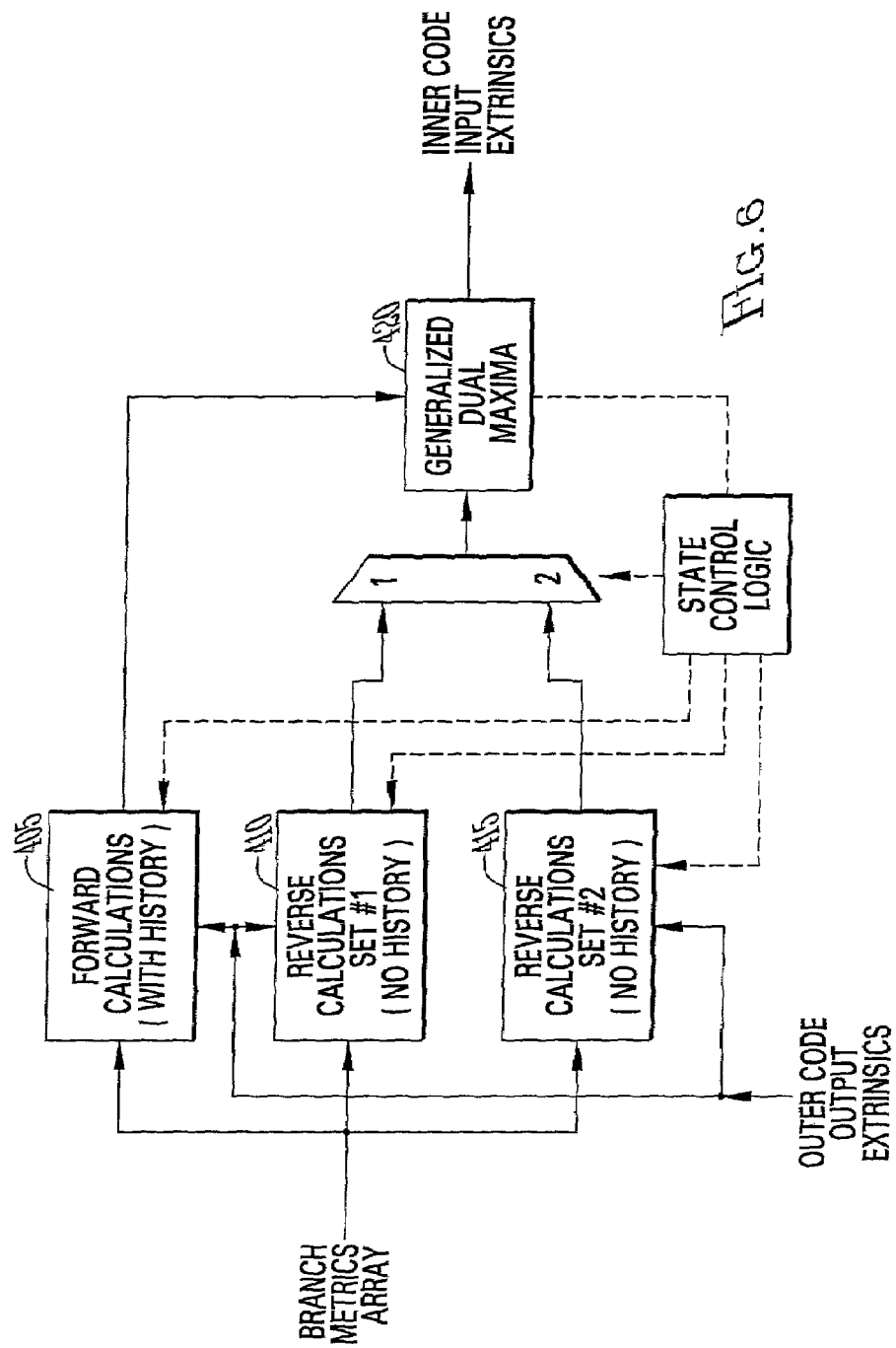
FIG. 6 is a detailed block diagram an a posteriori probability inner code decoder used in the demodulator of FIG. 3.

A block diagram of the inner code APP module 165 processing is shown in FIG. 6. The inner code APP module 165 inputs are the current block of branch metrics (one real-valued metric for each 3332 symbols *8 valid phase states *8 CPM levels), the next block first 40 symbols branch metrics and interleaved outer code output extrinsics (one real-valued value for each of 9996 block bits). The APP module 165 performs both forward calculations 405 and reverse path metrics calculations 410 and 415 through the trellis of all block symbols, phase states, and CPM levels. Generalized dual-maxima calculations 420 combine the outer code output extrinsics, the input branch metrics, and both the forward and backward path metrics arrays to produce an array of inner code input extrinsics (one real-valued value for each of the 9996 coded block bits).

Figure 7:
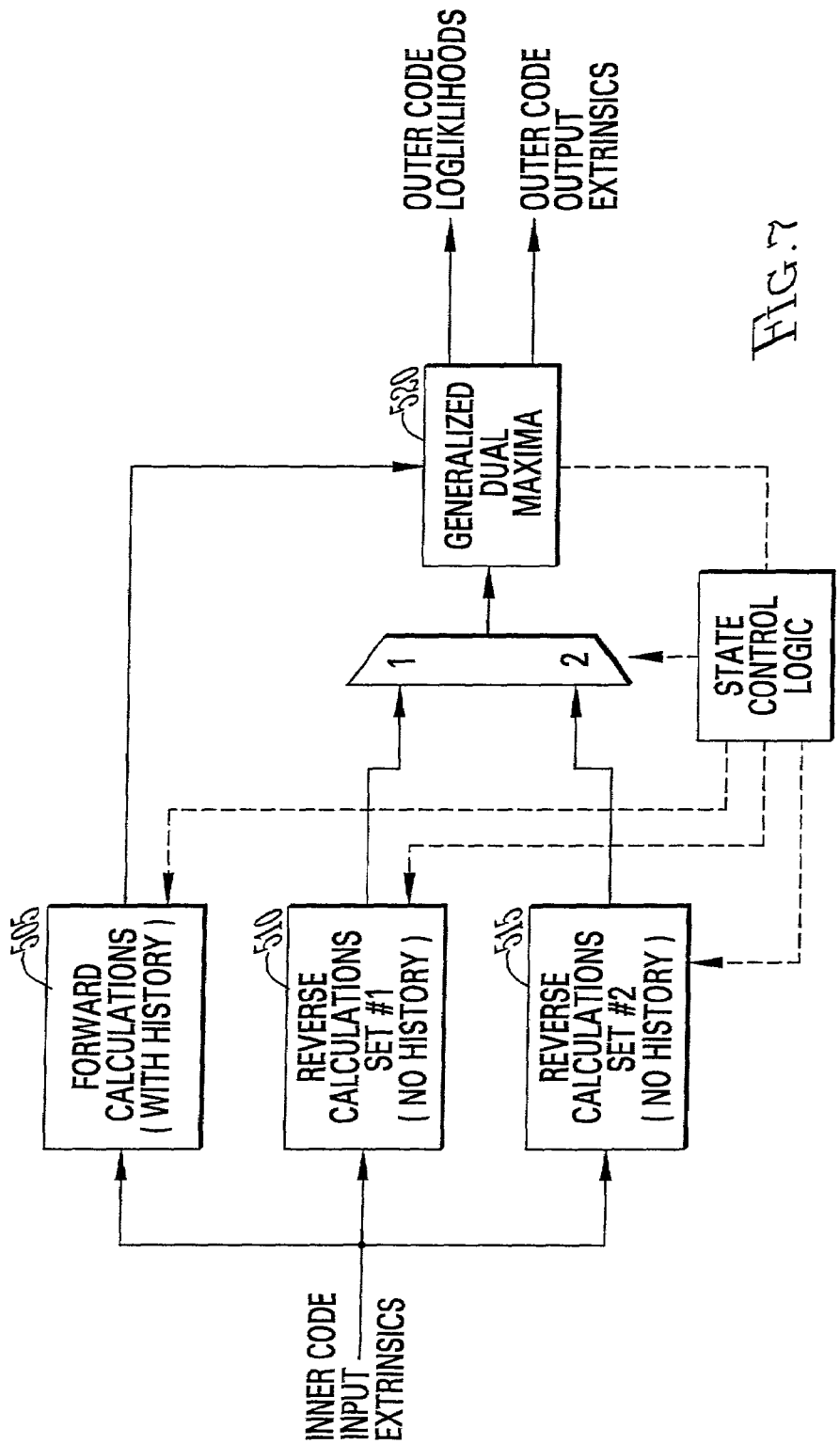
FIG. 7 is a detailed block diagram an a posteriori probability outer code decoder used in the demodulator of FIG. 3.

A block diagram of the outer code APP module 160 processing is shown in FIG. 7. The outer code APP module 160 input is the deinterleaved inner code input extrinsics from the random block deinterleaver 155. The module 160 performs both forward calculations 505 and reverse path metrics calculations 510 and 515 through the trellis of all block symbols and decoder states. Generalized dual-maxima calculations 520 combine the inner code input extrinsics and both the forward and backward path metrics arrays to produce an array of outer code output extrinsics (one real-valued value for each of the 9996 coded block bits). Also produced is an array of outer code input log-likelihood values (one real-valued value for each of the 6662 user data bits for the rate 2/3 code), whose sign represents the demodulated/decoded user data bits.

Figure 8:
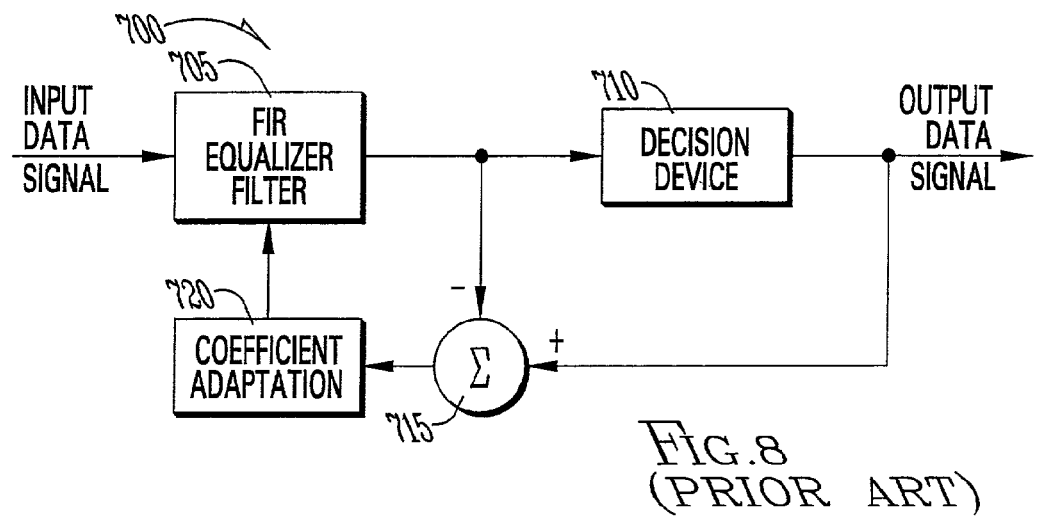
FIG. 8 is a block diagram of decision-directed adaptive equalizer known in the art.

A decision directed equalizer 700 known in the art is shown in FIG. 8. An input data signal having intersymbol interference (ISI) is received in the decision directed equalizer 700. A finite impulse response (FIR) equalizer filter 705 reduces the ISI by having a filter characteristic that approximates the inverse of the communications channel equivalent filter characteristic. The output of the FIR equalizer filter 705 is fed to a decision device 710 that determines what was most likely transmitted. The decision device 710 that may be a predictor or a slicer estimates whether the transmitted signal is logic one or zero. The output of the decision device 710 forms the equalizer output data signal with reduced or removed ISI. The output of the decision device 710 is also connected to a summing function 715 that compares the decision device 710 output to the FIR filter 705 output. The comparison results in an error signal that is used to adapt FIR filter 705 coefficients with a coefficient adaptation function 720 to minimize the error signal and to compensate for ISI on the output signal from the decision device 701.

Equalizer algorithms are useful for mitigating the effect of inter symbol interference (ISI) but their implementation greatly increases demodulator 140 complexity. Adaptive equalizers are usually decision-directed. However, the interleaving delay imposed by the turbo codec structure prevents the output of the turbo decoder from being used to supply symbol decisions for a feedback loop. The equalizer algorithms used with the BEAM demodulator 300 also must operate at the low SNR at which the BEAM demodulator is capable of operating. For these reasons, a new approach is needed to implementing decision directed equalizers.

Decision directed equalization requires that an estimate of a symbol be obtained in a timely fashion. The problem with using this technique for a joint modulation and coding waveform such as BEAM is that if the decisions are taken at the output of the turbo decoder, the 9996-bit latency inherent in the decoding process would severely affect equalizer performance. A method must be found to derive symbol decisions with only a few symbols of latency.

The inner APP decoder 165 of the iterative turbo decoder 301 in FIG. 3 may be used for providing decisions in the equalizer algorithm. The inner APP decoder 165 of the iterative turbo decoder 301 delivers decisions at a very high symbol error rate and high latency. The bit error rate of the inner decoder 165 is not much better than 50% during the first iteration of the iterative turbo decoder 301. An equalizer algorithm may be implemented by using the inner APP decoder 165 of the iterative turbo decoder 301 as a decision device 710 of FIG. 8. The traceback depth of calculations in a reverse path of inner turbo decoder 165 must be reduced to the minimum number of symbols possible to minimize latency. The output of a truncated inner APP decoder has a very high symbol error rate. If used as is the high error rate would be useless for decision feedback from the decision device 710. A way must now be found to properly utilize the symbol decisions from this truncated inner APP decoder. The simpler Viterbi algorithm could be used to construct a simplified decoder. The reasons for not doing this will be apparent subsequently. A factor to making use of the extremely high symbol error rate decisions issuing from this truncated inner APP decoder is to know, with high confidence, which decisions are correct. If the confidence value of that symbol is low, then it is best to ignore that symbol and make no decision.

Figure 9:
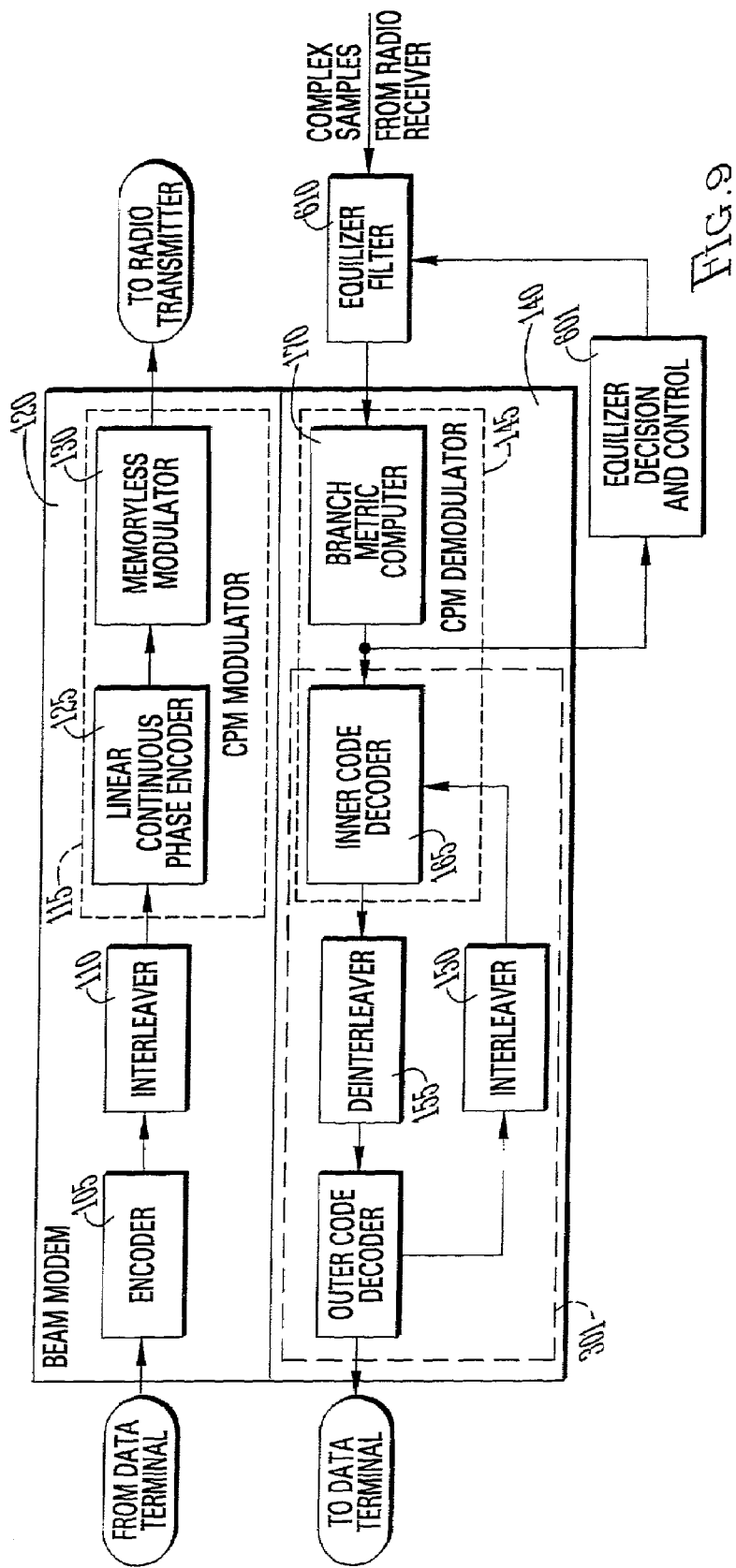
FIG. 9 is a block diagram of the present invention with the modem of FIG. 1 incorporating a equalizer algorithm.

An equalizer algorithm may be incorporated in the modem of FIG. 1 as shown in FIG. 9. The equalizer algorithm comprises a decision directed equalizer filter 610 that receives complex data samples containing coded information bits from the radio receiver (not shown). The output of the equalizer 610 is connected to the CPM demodulator 145 memoryless demodulator 170 that demodulates the complex data samples. A branch metrics computer performs the functions of the memoryless demodulator 170. The output of the memoryless demodulator 170 is connected to the inner code decoder 165 in the iterative turbo decoder 301 as before and to an equalizer decision and control function 601 containing the algorithm functions of the present invention as discussed in the following paragraphs.

Figure 10:
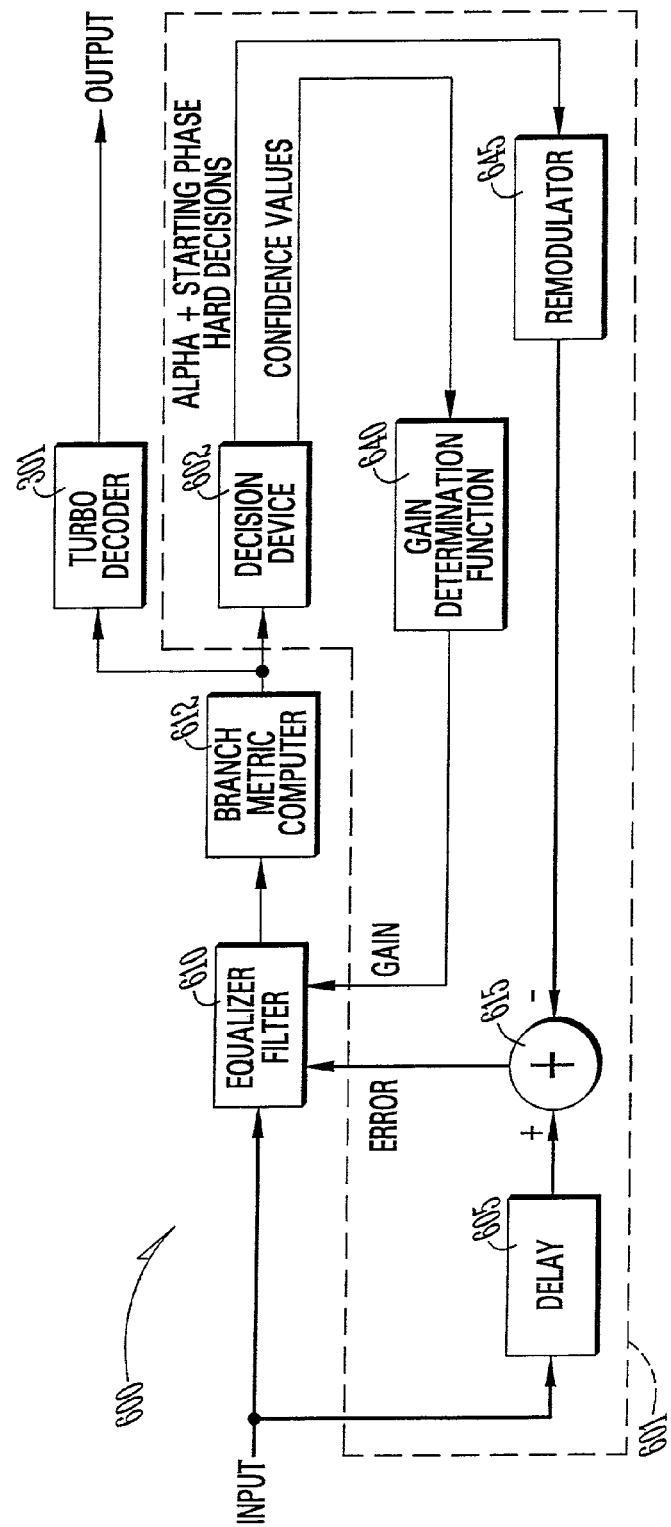
FIG. 10 is a detailed block diagram of the equalizer of the present invention.

The decision directed equalizer algorithm 600 of the present invention is shown in detail in FIG. 10. The decision directed equalizer algorithm 600 includes the equalizer filter 610 and the equalizer decision and control function 601 of FIG. 9. The truncated APP decoder discussed above is used as a decision device 602 and supplies a stream of high symbol error rate decisions.

In FIG. 10, complex input signals that are coded and CPM modulated are received by the equalizer filter 610. Equalizer filter 610 may be a FIR filter whose coefficients are adjusted to compensate for multipath distortion using gain and symbol error input signals. A branch metric computer 612, a truncated APP decoder decision device 602, and an adaptation gain block 640 function to produce a gain control signal for the equalizer. The branch metric computer 612 is the same as the branch metric computer 320 in FIG. 3 and functions as the memoryless demodulator 170 of FIG. 9. The APP decoder decision device 602 performs the decoding functions of a truncated inner APP decoder similar to the inner APP decoder 165 as previously discussed in conjunction with FIG. 3.

The equalizer filter 610 coefficients may be adjusted using the LMS adaptation algorithm. The equalizer filter 610 is a FIR filter that helps mitigate the effects of intersymbol interference in noise. The jth coefficient of the FIR filter at time k is denoted $[c_k]_j$. The adaptation algorithm for determining the coefficient at time k+1 is $$[c_{k+1}]_j = [c_k]_j + \beta E_k R^*_{k,j}$$ Equation 1 where β is a parameter known as gain step size, $E_k$ is the error at time k, and $R_{k,j}$ is the input sample to the equalizer that appears in unit delay j at time k, and the asterisk denotes complex conjugation. That is, $R_{k,j}$ is the input sample that was multiplied by $[c_k]_j$ at time k in the FIR filter.

An important part of the equalizer algorithm 600 and the part that differentiates it from a conventional equalizer algorithm is the APP decoder decision device 602. The decision device 602 generates an alpha value and a starting phase output. The alpha value is a symbol as described above for a tribit to alpha mapper 250 in conjunction with FIG. 2 for the CPM modulator and can take on one of eight values for the case of 8-ary CPM, representing the received tribit. The alpha value in FIG. 2 is from the group of alpha values −7, −5, −3, −1, 1, 3, 5, and 7. The decision device 602 starting phase or hard phase decision output for a symbol can also take on one of eight values for a modulation index h=1/8. Simulation has shown that truncating the traceback depth of the APP decoder decision device 602 to only two symbols works almost as well as a traceback depth of three or more symbols. Since low delay in the equalizer loop is important, a two-symbol traceback depth is used for the truncated APP decoder decision device 602 that introduces an N-symbol delay into the feedback loop.

The truncated APP decoder decision device 602 supplies a stream of decisions with high symbol error rate but with a minor time delay because of the shallow traceback depth. The decision device 602 since it uses the APP algorithm supplies confidence values as a decoder metrics output. A conventional Viterbi algorithm cannot be used because of the lack of a soft decision output. A SOVA (soft output Viterbi algorithm) may be an alternative to the APP algorithm. The equalizer filter 610 accepts soft outputs from the decision device 602 and uses the confidence values to control the gain of the adaptation process through gain determination function 640. The gain may be controlled with the step size (β) of a least mean square (LMS) or stochastic gradient algorithm. It is important to know, with high confidence, which decisions are good. To accomplish this, the LMS algorithm may apply a threshold that may be based on the signal-to-noise ratio (SNR), in adaptation gain determination function 640 to the APP decoder 602 decision confidence metrics output. If the confidence level exceeds some confidence threshold then with high confidence (desirably >90%), the symbol decision and the phase error estimate are accepted as correct and the adaptation algorithm adapts the equalizer 610 using a fixed gain. If the threshold is not met then the symbol decision and the phase error estimate is rejected. This rejection is declared an erasure and no adaptation occurs under this condition. Essentially, the step size β is either some fixed value $\beta_0$ when the confidence value is above the threshold, or 0 when it is below the threshold. This gain determination function 640 may be implemented using a comparator (not shown) that delivers logic '0' if the confidence metric is below the threshold and logic '1' if it is above the threshold. This comparator output is then used as an input to a logic 'AND' function (not shown), with the other input being $\beta_0$. Thus if the confidence metric is below the threshold, the comparator delivers a logic '0', and the output of the logic 'AND' function is 0. If the confidence metric is above the threshold, then the comparator delivers a logic '1', and the output of the 'AND' function is $\beta_0$.

More complex adaptation algorithms may also be used, where the step size, or the threshold, or both, are functions of previous decision confidence metrics as well. One such algorithm may increase β if several erasures have been determined (to improve speed of convergence), and decrease β if several symbols have been detected with high confidence (to reduce excess mean square error). This is similar to the "gear-shift" algorithm.

A third approach, uses two thresholds, a lower threshold $m_L$ and an upper threshold $m_U$. If the decision confidence metric is below the lower threshold, $m_L$, an erasure is declared, and β=0. If the decision confidence metric is above the upper threshold, $m_U$, then β is set to a constant $\beta_{max}$. If the decision confidence metric lies between the two thresholds, then β is a linear function of the decision confidence metric m. That is, $\beta = \beta_{max}(m-m_L)/(m_U-m_L)$.

The APP decoder 602 hard decision output is remodulated into a data signal in remodulate block 645. The remodulated data signal is fed to a summing function 615 where it is compared to a delayed version of the input signal. The difference between the remodulated data signal and the delayed input signal, summed over the samples per signal, forms the error signal, $E_k$, as shown in Equation 1. Delay 605 is used to delay the input signal before the comparison in summing function 615 to compensate for the two-symbol traceback depth of the decision device 602. The remodulate block 645 may be implemented as a lookup table based on the detected alpha and starting phase.

The output of the branch metrics computer 612 is connected to the turbo decoder 301 where it is processed as described above in conjunction with FIG. 3 to decode the input signal and arrive at a decoded and ISI-free signal.

It is believed that the equalization method and apparatus for complex modulations in noisy environments of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An equalizer for use with complex modulation modems and for operating in noisy communications channel environments to reduce intersymbol interference comprising:
   an equalizer filter for receiving an input data signal and for adapting to compensate for the noisy communications channel environments and reduce intersymbol interference to the input signal;
   a branch metric computer connected to the equalizer filter for demodulating the equalizer filter adapted input data signal;
   a decision device connected to the branch metric computer for delivering an alpha value and starting phase information and confidence values from the demodulated input data signal at a reduced latency;
   a gain determination function connected to the equalizer filter and to the decision device for receiving the confidence values and for determining adaptation gain for the equalizer filter;
   a remodulator connected to the decision device to receive the alpha value and starting phase information and for remodulating the alpha value and starting phase information into a remodulated data signal; and
   a summing function connected to the equalizer filter and to the remodulator for comparing the remodulated data signal to a delayed version of the input signal to generate an error signal and to provide the error signal to the equalizer filter to adjust the equalizer filter.

2. The equalizer of claim 1 wherein the equalizer filter further comprises a finite impulse response filter having adjustable coefficients and gain.

3. The equalizer of claim 1 wherein the branch metric computer further comprises a plurality of branch metrics computer blocks for computing branch metric values for a plurality of phase states wherein each branch metric is computed as a square of a Euclidean distance between an actual symbol value and an ideal symbol corresponding to a phase state and alpha value.

4. The equalizer of claim 1 wherein the decision device further comprises an APP decoder for providing a decoder metrics output confidence level with a reduced traceback depth to reduce the latency.

5. The equalizer of claim 1 wherein the gain determination function determines adaptation gain with a gain step size when the confidence value is greater than a threshold and declaring an erasure and not adapting the gain when the confidence value is less than the threshold.

6. The equalizer of claim 5 wherein the gain determination function further comprises a comparator that delivers the gain step size to the equalizer filter when the confidence value is above a threshold and delivers the erasure when the confidence value is below the threshold.

7. The equalizer of claim 5 wherein the gain determination function increases the gain step size if several erasures have been determined and decreases the gain step size if the confidence value for several data symbols have been greater than the threshold.

8. The equalizer of claim 1 wherein the gain determination function determines adaptation gain to be a maximum gain step size when the confidence value is greater than an upper threshold, declares an erasure and does not adapt the gain when the confidence value is less than a lower threshold, and varies gain step size when the confidence value is between the upper threshold and the lower threshold.

9. The equalizer of claim 1 wherein the remodulator further comprises a lookup table to supply the remodulated data signal based on the alpha and starting phase.

10. The equalizer of claim 4 wherein the APP decoder decision device has a traceback depth of two symbols.

11. A bandwidth efficient advanced modulation waveform modem having concatenated convolutional coding, interleaving, and continuous phase modulation and comprising a modulator connected to a transmitter to transmit signals having coded information bits over a noisy communications channel and a decoder connected to a receiver to receive the signals over the noisy communications channel said decoder comprising:
    an equalizer filter for receiving an input data signal and adapting to compensate for the noisy communications channel and reduce intersymbol interference to the input signal;
    a branch metric computer connected to the equalizer filter for demodulating the equalizer filter adapted input data signal;
    an iterative turbo decoder connected to the branch metric computer for decoding the adapted input signal;
    a decision device connected to the branch metric computer for delivering an alpha value and starting phase information and confidence values from the demodulated input data signal at a reduced latency;
    a gain determination function connected to the equalizer filter and to the decision device for receiving the confidence values and determining adaptation gain for the equalizer filter;
    a remodulator connected to the decision device to receive the alpha value and starting phase information and remodulating the alpha value and starting phase information into a remodulated data signal; and
    a summing function connected to the equalizer filter and to the remodulator for comparing the remodulated data signal to a delayed version of the input signal to generate an error signal and to provide the error signal to the equalizer filter to adjust the equalizer filter.

12. The modem of claim 11 wherein the equalizer filter further comprises a finite impulse response filter having adjustable coefficients and gain.

13. The equalizer modem of claim 11 wherein the branch metric computer further comprises a plurality of branch metrics computer blocks for computing branch metric values for a plurality of phase states wherein each branch metric is computed as a square of a Euclidean distance between an actual symbol value and an ideal symbol corresponding to a phase state and alpha value.

14. The modem of claim 11 wherein the decision device further comprises an APP decoder for providing a decoder metrics output confidence level with a reduced traceback depth to reduce the latency.

15. The modem of claim 11 wherein the gain determination function delivers a gain step size to the equalizer filter when the confidence value is greater than a threshold and declaring an erasure and not adapting the gain when the confidence value is less than the threshold.

16. The modem of claim 15 wherein the gain determination function increases the gain step size if several erasures have been determined and decreases the gain step size if confidence value for several data symbols have been greater than the threshold.

17. The modem of claim 11 wherein the gain determination function determines adaptation gain to be a maximum gain step size when the confidence value is greater than an upper threshold, declaring an erasure and not adapting the gain when the confidence value is less than a lower threshold, and varying gain step size when the confidence value is between the upper threshold and the lower threshold.

18. The modem of claim 11 wherein the remodulator further comprises a lookup table to supply the remodulated data signal based on the alpha and starting phase.

19. The modem of claim 11 wherein the turbo decoder further comprises:
  an inner code decoder connected to the branch metrics computer for decoding the continuous phase shift modulation to generate probabilities for decoded information bits and new probabilities for the coded information bits;
  a deinterleaver connected to the inner code decoder for reordering the decoded information bit probabilities;
  an outer code decoder connected to the deinterleaver to generate probabilities for the information bits and new probability estimates for the coded bits; and
  an interleaver connected to the outer code decoder and the inner code decoder for reordering the new probability estimates for the coded bits and delivering said probability estimates to the inner code decoder.

* * * * *